(12) United States Patent
Hirai et al.

(10) Patent No.: US 6,475,478 B2
(45) Date of Patent: Nov. 5, 2002

(54) ADSORBENT, ADSORBING AND REMOVING PROCESS AND ADSORBER FOR ENDOGENOUS CANNABINOID

(75) Inventors: Fumiyasu Hirai, Amagasaki (JP); Tamiji Fujimoto, Settsu (JP); Hiroshi Sakurai, Takasago (JP); Shigeo Furuyoshi, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/933,112

(22) Filed: Aug. 21, 2001

(65) Prior Publication Data

US 2002/0045157 A1 Apr. 18, 2002

(30) Foreign Application Priority Data

Aug. 24, 2000 (JP) ........................................ 2000-253484

(51) Int. Cl.[7] .......................... A61K 31/00; A61K 31/04
(52) U.S. Cl. ..................... 424/78.12; 435/2; 435/267; 435/269; 210/634; 210/645
(58) Field of Search .................. 424/400, 725, 424/78.08, 130.1; 514/197; 435/267, 269; 210/634, 645

(56) References Cited

U.S. PATENT DOCUMENTS 4,650,784 A 3/1987 Ramsden et al. ........... 502/407

FOREIGN PATENT DOCUMENTS

| EP | 0 819 439 A1 | 1/1998 |
| EP | 0 993 834 A1 | 4/2000 |
| EP | 1 110 602 A1 | 6/2001 |
| EP | 1 142 633 A1 | 10/2001 |

OTHER PUBLICATIONS

Y. Wang et al.; "Polymyxin B binds to anandamide and inhibits its cytotoxic effect," FEBS Letters 470 (2000) pp. 151–155.

*Primary Examiner*—Leon B. Lankford, Jr.
*Assistant Examiner*—Ruth Davis
(74) *Attorney, Agent, or Firm*—Armstrong, Westerman & Hattori, LLP

(57) ABSTRACT

There are provided an adsorbent which can effectively adsorb and remove endogenous cannabinoid in fluid, and a process for removing endogenous cannabinoid in fluid by means of the adsorbent. The adsorbent of endogenous cannabinoid is obtained by fixing a compound having a log P value (P indicating distribution coefficient in octanol-water system) of at least 3.50 on a water-insoluble carrier. Endogenous cannabinoid in fluid can be adsorbed and removed in an effective manner by contacting the adsorbent of endogenous cannabinoid with fluid containing endogenous cannabinoid.

9 Claims, 2 Drawing Sheets

ADSORBENT, ADSORBING AND REMOVING PROCESS AND ADSORBER FOR ENDOGENOUS CANNABINOID

BACKGROUND OF THE INVENTION

The present invention relates to an adsorbent for adsorbing and removing endogenous cannabinoid from body fluid, a process for adsorbing and removing endogenous cannabinoid, and an adsorber for endogenous cannabinoid.

It is known that cannabinoids, the main substance of the physiological action of marijuana (cannabis), brings about mental effects such as hallucination and feeling of euphoria. As cannabinoid receptors, a receptor (CB1) expressed in central nerves and a receptor (CB2) expressed in peripheral immune cells are known. Endogenous ligands to these cannabinoid receptors, i.e., the ligand generated in living bodies are called endogenous cannabinoid. Known examples of the endogenous cannabinoid are anandamide and 2-arachidonoylglycerol (hereinafter referred to as 2-AG).

The endogenous cannabinoid bears various physiological activities such as (1) drop in blood pressure and bradycardia for cardiovascular system, (2) inhibition of NO generation in macrophages for immune system, (3) defect of memory and inhibition of pain sensation for central nerve system, and (4) induction of endothelial cell apoptosis for coagulation fibrinolysis system.

Recently, it became clear that anandamide is generated in macrophage and 2-AG is generated in blood platelet by means of lipopolysaccharide stimulus (hereinafter referred to as LPS). It is also observed that the generated endogenous cannabinoid causes drop in blood pressure. Furthermore, some raises possibility that the endogenous cannabinoid generated in macrophage or blood platelet is responsible for the blood pressure drop in septic shock. In fact, there is a report that concentrated endogenous cannabinoid was detected in the blood of patients with septic shock.

From these facts, a treatment is expected for the blood pressure drop in septic shock and the like by removing endogenous cannabinoid from body fluid of patients. However, no process for adsorbing and removing endogenous cannabinoid has been available so far. Hence, there has been considerable demand for such processes. Yin Wang et al reported that the adsorption of anandamide was possible by means of a substance obtained by fixing an antibiotic, polymyxin B (FEBS Letters, vol. 470, pp151–155, 2000). However, many steps are required in order to prepare such an adsorbent. Besides, the polymyxin B, one of the antibiotics, is very expensive. For these reasons, there is a desire for a process for adsorbing and removing endogenous cannabinoid by using a lower-price substance.

The present invention was carried out in order to solve the above problems. The object of the present invention is to provide an adsorbent which can adsorb and remove endogenous cannabinoid in body fluid efficiently, a process for adsorbing and removing endogenous cannabinoid in body fluid by using the adsorbent, and an adsorber for endogenous cannabinoid.

SUMMARY OF THE INVENTION

Intense studies were conducted as to an adsorbent which can adsorb and remove endogenous cannabinoid in body fluid efficiently. As a result, the present invention has been completed based on the findings that an adsorbent obtained by fixing a compound having a log P value of at least 3.50 on a water-insoluble carrier can adsorb and remove endogenous cannabinoid efficiently.

That is, the present invention relates to an adsorbent for endogenous cannabinoid obtained by fixing a compound having a log P value (P indicating distribution coefficient of octanol-water system) of at least 3.50 on a water-insoluble carrier.

The water-insoluble carrier is a water-insoluble porous carrier in a preferred embodiment.

The endogenous cannabinoid is anandamide in a preferred embodiment.

The endogenous cannabinoid is 2-AG in a preferred embodiment.

The present invention also relates to a process for adsorbing and removing endogenous cannabinoid comprising a step of contacting the adsorbent of endogenous cannabinoid with fluid containing endogenous cannabinoid.

The fluid is body fluid in a preferred embodiment.

The present invention also relates to an adsorber for endogenous cannabinoid comprising a container having an inlet and an outlet, and a means for preventing the adsorbent from escaping outside the container, wherein the container is filled with the adsorbent of endogenous cannabinoid.

DETAILED DESCRIPTION

Figure 1:
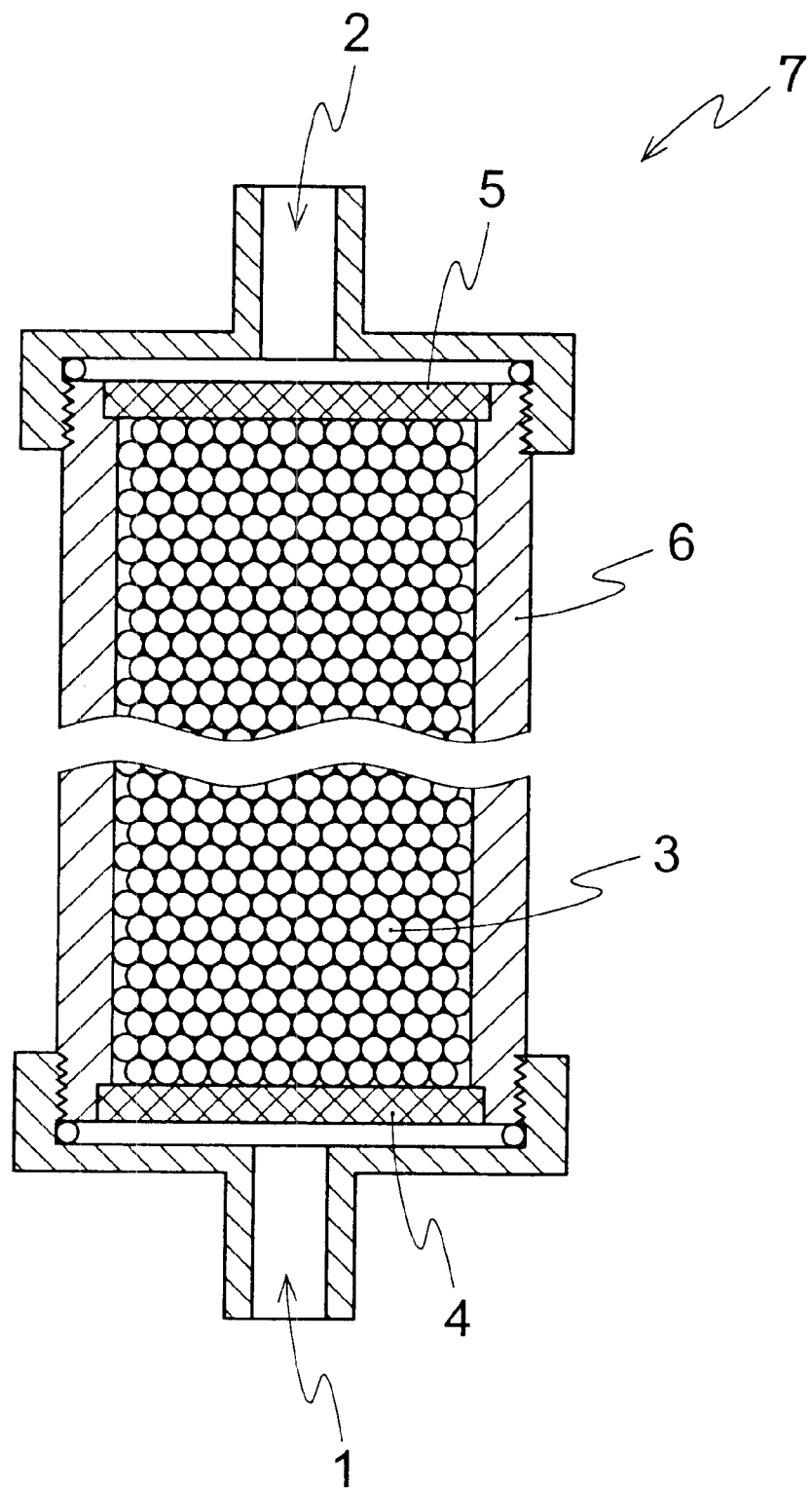
FIG. 1 is a schematic sectional view showing an embodiment of the adsorber of endogenous cannabinoid according to the present invention.

The endogenous cannabinoid in the present invention means endogenous ligands of cannabinoid receptors, i.e., the ligand generated in living bodies. Typical examples of the endogenous cannabinoid are anandamide and 2-AG. Anandamide is represented by the formula $C_{22}H_{37}NO_2$ and has the molecular weight of 347.5. On the other hand, 2-AG is represented by the formula $C_{23}H_{38}O_4$ and has the molecular weight of 378.5.

The body fluid in the present invention means blood, plasma, serum, ascites, lymph, arthral fluid and cerebrospinal fluid, fragments obtainable therefrom and fluid components derived from other living organs.

The adsorbent of the present invention is obtained by fixing a compound having a log P value of at least 3.50 on a water-insoluble carrier. The log P value is parameter for hydrophobic property of compounds. The representative distribution coefficient P in octanol-water system can be determined as follow. First, a compound is dissolved in octanol (or water). Thereto is added water (or octanol) of the same quantity and the mixture is shaken for 30 minutes by using a Griffin flask shaker (made by Griffin & George Ltd.). Thereafter, the mixture is centrifuged at 2,000 rpm for an hour or two. The respective concentrations of the compound in both octanol and water layers are measured at room temperature and atmospheric pressure by various methods such as spectroscopic method or GLC, and the partition coefficient P is obtained from the following equation.

$$P = C_{oct}/C_w$$

$C_{oct}$: concentration of compound in octanol layer
$C_w$: concentration of compound in water layer Many scientists have conducted actual measurements of log P values for various compounds so far, and those actual values are summarized by C. Hansch et al (see *Partition Coefficients and Their Uses; Chemical Reviews,* Vol. 71, p 525, 1971).

As to the compounds whose actual values are unknown, reference can be made to the values ($\Sigma$ f) calculated by using hydrophobic fragment constant f shown by R. F. Rekker in *The Hydrophobic Fragmental Constant* (Elsevier Sci. Pub. Com., Amsterdam, 1977). The hydrophobic fragment constant is a value indicating hydrophobic property of various fragments determined by statistical calculation based on many log P values. It is reported that the sum of f values of each fragment constituting a compound is almost equal to the log P value. In the present invention, log P includes $\Sigma$ f.

In order to find a compound effective for adsorbing endogenous cannabinoid, investigation was made by fixing compounds having various log P values. As a result, it has been found that compounds having a log P value of at least 3.50, preferably at least 4.00, more preferably at least 5.00 is effective for adsorbing endogenous cannabinoid and that compounds having a log P value of less than 3.50 hardly show adsorbing ability for endogenous cannabinoid. For example, when an alkyl amine is fixed and the kind of the alkyl amine is changed to n-decyl amine (log P=4.07) from n-octyl amine (log P=2.90), it was found that the change resulted in remarkable increase in adsorbing ability for endogenous cannabinoid. These results reveal that the adsorbing ability of the adsorbent for endogenous cannabinoid of the present invention can be attributed to hydrophobic interaction between the endogenous cannabinoid and a group of atoms introduced on a carrier by fixing a compound having a log P value of at least 3.50.

As to the compound fixed on a water-insoluble carrier in the present invention, any can be used without particular limitation as long as the compound has a log P value of at least 3.50. However, when a compound is chemically bonded to the carrier, part of the compound is often eliminated. In case where the leaving group largely contributes to the hydrophobic property of the compound, in other words, where the elimination causes to lower the hydrophobic property of the group of atoms fixed on the carrier to less than 3.50 in log P, such a compound is not suitable for those used in the present invention in view of the main idea of the invention. For example, when iso-pentyl benzoate ($\Sigma$ f=4.15) is fixed on a hydroxyl group-containing carrier transesterification, the atomic group actually fixed on the carrier is $C_6H_5CO$—whose $\Sigma$ f is at most 1. Suitability of such a compound for the present invention may be determined based on whether the log P value of the compound whose leaving group is substituted by hydrogen is at least 3.50 or not.

Among compounds having a log P value of at least 3.50, preferable ones are those containing a functional group useful for bonding the compound to a carrier, such as unsaturated hydrocarbons, alcohols, amines, tiols, carboxylic acids and derivatives thereof, halogenated compounds, aldehydes, hydrazides, isocyanates, oxirane ring-containing compounds such as glycidyl ether, and haloganated silane. Examples thereof are amines such as decyl amine, dodecyl amine, hexadecyl amine and octadecyl amine, alcohols such as dodecyl alcohol and hexadecyl alcohol as well as glycidyl ether of these alcohols, carboxylic acids such as decanoic acid, dodecanoic acid, stearic acid and oleic acid as well as acyl halide compounds thereof, carboxylic acid derivatives such as esters and amides, haloganated compounds such as octyl chloride, octyl bromide, decyl chloride and dodecyl chloride, and tiols such as octane tiol and dodecane tiol.

In addition to these, it is possible to use a compound having a log P value of at least 3.50 out of compounds wherein the hydrogen atom in the hydrocarbon part of the above-described compound is substituted by a substituent containing a hetero atom such as halogen, nitrogen, oxygen or sulfur, or by another alkyl group. Other useful compounds are those having a log P value of at least 3.50 listed in the tables on p. 555 to p. 613 of the above *Partition Coefficients and Their Uses; Chemical Reviews* by C. Hansch et al. However, the useful compounds in the present invention are not limited thereto.

These compounds can be used alone or in combination of two or more, even with a compound having a log P value of less than 3.50.

The water-insoluble carrier in the adsorbent of the present invention means a carrier which is solid at normal temperature under normal pressure and whose solubility to water is very small. The water-insoluble carrier is shaped in particles, plates, fiber, hollow fiber and the like, and the shape and the size are not particularly limited. However, when the adsorbent of the present invention is used by filling it in a column, the shape and the size of the adsorbent must be designed to create enough space so that the components contained in materials to be adsorbed such as body fluid other than endogenous cannabinoid can pass through.

For example, when the adsorbent of the present invention is in particles, the average particle size is preferably 5 to 1,000 μm. When the average particle size is less than 5 μm, there is a tendency that enough space for passing cannot be formed in case where the body fluid contains cells. When it is more than 1,000 μm, there is a tendency that no sufficient adsorbing ability per volume can be achieved. The average particle size is more preferably 25 to 1,000 μm, most preferably 40 to 600 μm. Narrower particle size distribution is preferable from the viewpoint that increase in pressure drop is not caused. When body fluid is blood, the average particle size of the adsorbent is preferably at least 200 μm to at most 1,000 μm.

When the adsorbent of the present invention is fibrous and hollow at the same time, the inner diameter is preferably at least 1 μm, more preferably 2 to 500 μm, most preferably 5 to 200 μm. When the inner diameter is less than 1 μm, there is a tendency that body fluid does not pass through the hollow sufficiently in case where the body fluid contains cells. When it is more than 500 μm, there is a tendency that no sufficient adsorbing ability per volume can be achieved.

Examples of the water-insoluble carrier of the adsorbent of the present invention are inorganic carriers such as glass beads and silica gel, a synthetic polymer such as cross-linked poly(vinyl alcohol), cross-linked polyacrylic acid, cross-linked polyacrylamide or cross-linked polystyrene, and organic carriers comprising a polysaccharide such as crystalline cellulose, cross-linked cellulose, cross-linked agarose or cross-linked dextrin. Other examples are composite carriers obtained by an organic-organic combination or an organic-inorganic combination.

Among these, hydrophilic carriers are preferable since they have relatively small nonspecific adsorption and show excellent adsorption selectivity for endogenous cannabinoids. The hydrophilic carrier hereupon means those having a contact angle to water of at most 60° when the compound constituting the carrier is shaped into plates. Though various methods of measuring a contact angle to water are known, a method by putting water droplets on a compound shaped into plates is best known, for example, as Ikeda describes in his book (*Jikken Kagaku Sensho; Science of Colloids*, Chap. 4, *Interface Thermodynamics*, p.75 to p.104, published by Shoka Shobo, 1986). Examples of the compound whose contact angle to water measured by the above method is at most 60° are cellulose, poly(vinyl alcohol), a saponificated compound of an ethylene-vinyl acetate copolymer, polyacrylamide, polyacrylic acid, polymethacrylic acid, poly(methyl methacrylate), polyethylene grafted with polyacrylic acid, polyethylene grafted with polyacrylamide, glass and the like.

More preferably, these water-insoluble carriers have numerous pores of suitable size, in other words, a porous structure. The porous carrier obviously includes the carriers having spaces (macropores) formed by agglomeration of minute spheres when one spherical particle is formed from a basic polymer matrix by the agglomeration. However, there are also carriers which have pores formed by agglomeration of nuclei in a minute spheres constituting a basic polymer matrix, and those which have pores (micropores) formed when a copolymer having a three-dimensional structure (polymer net) is swelled by an organic solvent having affinity therewith.

Also, water-insoluble carriers having a totally porous structure are more preferable than those having a surface porous structure from the viewpoint of adsorption ability per unit volume of the adsorbent. The pore volume and the specific surface area are preferably large to such a degree that the adsorption property is not lost.

An example of the carrier which satisfies these preferable conditions is a porous cellulose carrier. The porous cellulose carrier has following advantages.

(1) It is unlikely that the porous cellulose carrier is broken or generates impalpable powder due to operations such as stirring since it has relatively high mechanical strength and toughness. In addition, since compaction never occurs even if an adsorbent is filled in a column and body fluid is passed at a high speed, passing at a high flow rate becomes possible. Also, the small pore structure is not easily affected by high-pressure steam sterilization.

(2) The carrier is hydrophilic and has many hydroxyl groups useful for connecting the carrier with a ligand since it comprises cellulose. Besides, the carrier has less nonspecific adsorption.

(3) Even if pore volume is increased, adsorption capacity of not less than that of a soft carrier can be achieved because of relatively high strength.

(4) The porous cellulose carrier has higher safety than a synthetic polymer carrier and the like. For these reasons, the porous cellulose carrier is one of the most suitable carriers used in the present invention. However, the carrier used in the present invention is not limited thereto. Furthermore, each of the above carriers may be used alone or in combination of two or more.

It is preferable that the pore of the water-insoluble porous carrier has such a size that the target substance of adsorption may enter at a certain probability. Since the adsorptive target of the adsorbent of the present invention, i.e., endogenous cannabinoid, has relatively small molecular weight of about 300 to 400, water-insoluble carriers having a porous structure is quite adequate for endogenous cannabinoid to enter the pore. Thus, there is no particular limitation for the useful water-insoluble porous carrier. Meanwhile, it is preferable to minimize invasion of proteins in body fluid from the viewpoint of safety. As a measure for the molecular weight of the substance which can enter the pore, molecular weight of exclusion limit is generally employed. The molecular weight of exclusion limit means the molecular weight of a molecule which has the smallest molecular weight out of molecules which cannot enter a pore (and are excluded) in a gel permeation chromatography. The method is described in a book (for example, *Experiments on High-speed Liquid Chromatograph* by Hiroyuki Hatano and Toshihiko Hanai published from KAGAKU-DOJIN PUBLISHING CO., LTD.) and the like. In general, molecular weights of exclusion limit of spherical proteins, dextran, poly(ethylene glycol) and the like are often investigated. As to the upper exclusion limit of molecular weight for the carrier of the present invention, it is preferable to adopt the value obtained from the spherical proteins.

When an exclusion limit of molecular weight is more than 600,000, adsorption of proteins (particularly albumin) in body fluid is increased, resulting in lowering of practical performance of the adsorbent. Therefore, the exclusion limit of molecular weight for spherical proteins of the carrier used in the present invention is at most 600,000, preferably at most 300,000, more preferably at most 100,000.

Preferably, the carrier contains a functional group which can be used for the reaction of fixing a ligand. Examples of the functional group are a hydroxyl group, an amino group, an aldehyde group, a carboxyl group, a tiol group, a silanol group, an amido group, an epoxy group, a halogen group, a succinyl group, an acid anhydride group and the like. However, the functional group of the present invention is not limited thereto.

Both hard carriers and soft carriers may be used as the carrier of the present invention. However, in case of using an adsorbent for extracorporeal circulation, it is important to prevent plugging when the column is filled with the adsorbent and fluid is passed therethrough. To that end, sufficient mechanical strength is required for the carrier. Accordingly, it is more preferable to use a hard carrier in the present invention. Herein, the hard carrier, for example, a granular carrier, means those having linear relationship of at most 0.3 kg/cm$^2$ between pressure drop $\Delta$ P and flow rate when a cylindrical column is uniformly filled with the adsorbent and aqueous fluid is passed therethrough as in the reference example described below.

The adsorbent of the present invention can be obtained by fixing a compound having a log P value of at least 3.50 on a water-insoluble carrier. As to the fixing process, any of various known processes can be applied without any particular limitation. However, in case of using the adsorbent of the present invention for extracorporeal circulation, it is important to prevent ligand from separating and eluting as much as possible from the viewpoint of safety. To this end, it is preferable to fix the compound according to the covalent bonding method.

In the adsorbent of the present invention, the amount of the compound to be fixed is preferably 1 to 5,000 $\mu$mol/g- in wet weight, more preferably 5 to 3,000 $\mu$mol/g- in wet weight. When the amount of the compound to be fixed is less than 1 $\mu$mol/g- in wet weight, adsorption of endogenous cannabinoid tends to be insufficient. When it is more than 5,000 $\mu$mol/g- in wet weight, blood platelets and the like tend to adhere when the fluid is blood.

There are various processes for adsorbing and removing endogenous cannabinoid from body fluid by using the adsorbent of the present invention. As the most convenient process, there is one in which body fluid is taken out, stored in a bag and the like, mixed and contacted with an adsorbent to adsorb and remove endogenous cannabinoid, and then the adsorbent is filtered to obtain body fluid from which endogenous cannabinoid is removed. There is also another process in which an adsorbent is filled into a container having an inlet and an outlet for body fluid as well as a filter which passes body fluid but blocks the adsorbent. In the process, the body fluid is then passed though the container and contacted with the adsorbent. Either method can be used, but the latter process is more suitable for the adsorbent of the present invention. This is because the operation is easier and because endogenous cannabinoid can be removed efficiently on-line from body fluid of patients, especially blood, when the device is incorporated into an extracorporeal circulation circuit.

Though the adsorbent of the present invention is used independently in the herein-mentioned extracorporeal circulation circuit, it can be combined with other extracorporeal circulation treatment systems. For example, combination with dialytic treatment is also possible including an artificial dialysis circuit and the like.

Next, explanation is made as to the adsorber of the present invention in which the above adsorbent of endogenous cannabinoid is used based on FIG. 1 showing schematic cross-section of one embodiment. In FIG. 1, numeral 1 indicates inlet of fluid, numeral 2 outlet of fluid, numeral 3 the adsorbent of endogenous cannabinoid of the present invention, numerals 4 and 5 a filter which passes fluid and components included in the fluid but blocks the above adsorbent of endogenous cannabinoid, numeral 6 a column and numeral 7 an adsorber of endogenous cannabinoid. However, an adsorber of endogenous cannabinoid is not limited to these examples. Any adsorber may be used as long as it comprises a container which is filled with the above adsorbent and has an inlet and outlet of fluid, and a means for preventing spillage of the adsorbent of endogenous cannabinoid.

Examples of the means for preventing spillage of the adsorbent are filters such as mesh, non-woven fabric and cotton plug. Though there is no particular limitation for shape, material and size of the container, a cylindrical container is preferable regarding the shape. A material having sterilization resistance is preferable for the container. Examples thereof are silicone-coated glass, polypropylene, poly(vinyl chloride), polycarbonate, polysulfone, polymethylpentene and the like. Preferably, the capacity of the container is 50 to 1,500 ml, and the diameter is 2 to 20 cm. More preferably, the capacity of the container is 100 to 800 ml and the diameter is 3 to 15 cm. Most preferably, the capacity of the container is 150 to 400 ml and the diameter is 4 to 10 cm. When the volume of the container is less than 50 ml, the adsorbing amount is insufficient. And when it is more than 1,500 ml, the extracorporeal circulation amount increases. Thus, these out-of-ranges are not preferable. The diameter of the container of less than 2 cm is not preferable because pressure drop is increased due to linear velocity growth. The diameter of more than 20 cm is not preferable because handling becomes difficult and yet the risk of coagulation arises due to linear velocity decline.

Hereinafter the present invention is explained in more detail by means of the following Examples, but the present invention is not limited thereto.

[Reference Example]

A glass cylindrical column (inner diameter: 9 mm, column length: 150 mm) equipped with filters having pore diameter of 15 µm on the both ends is homogeneously filled with materials of an agarose material (Biogel A-5m, particle diameter: 50 to 100 mesh, available from Bio-rad Co., Ltd.), a vinyl polymer material (TOYOPEARL HW-65, particle diameter: 50 to 100 µm, available from Tosoh Corporation) and a cellulose material (CELLULOFINE GC-700m particle diameter: 45 to 105 µm, available form ChissoCorp.), respectively. Water is sent by a peristatic pump. The relationship between flow rate and pressure drop ΔP was determined. The results are shown in FIG. 2.

Figure 2:
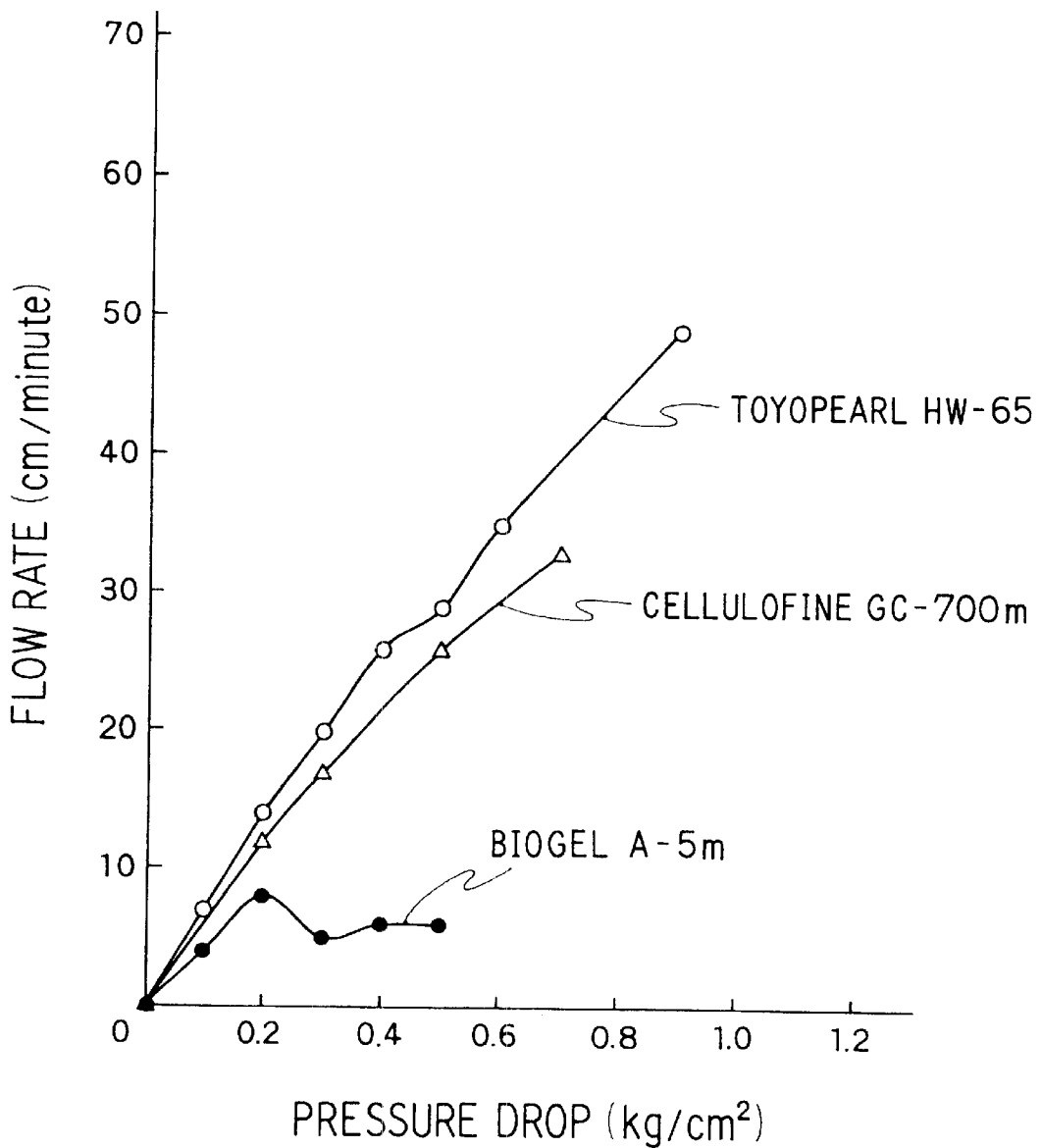
FIG. 2 is a graph showing the results of examining relationships between flow rate and pressure drop by using three kinds of materials.

As shown in FIG. 2, while flow rates of TOYOPEARL HW-65 and CELLULOFINE GC-700m increase almost in proportion to the increase of pressure, Biogel A-5m shows compaction and flow rate does not increase even though the pressure is increased. Those having linear relationship between flow rate and pressure drop ΔP of at most 0.3 kg/cm$^2$ as this material is called a hard material in the present invention.

EXAMPLE 1

Water was added to 170 ml of a cellulose porous carrier, CELLULOFINE GC-200m (available from ChissoCorp., exclusion limit of molecular weight of spherical protein: 140,000, particle diameter: 45 to 105 µm) so that the total is brought to 340 ml. Thereafter, 90 ml of 2M sodium hydroxide was added thereto and the temperature of the mixture was set to 40° C. Thereto was added 31 ml of epichlorohydrin and reaction was continued for two hours with stirring at 40° C. After the reaction was completed, sufficient washing was performed, and epoxidated CELLULOFINE GC-200m was obtained.

The epoxidated CELLULOFINE GC-200m was taken out in an amount of 10 ml, and 200 mg of n-hexadecyl amine (Σf=7.22) was added thereto. The mixture was kept at 45° C. in ethanol and reaction was continued for six days. After the reaction was completed, washing was performed by ethanol and then by water, and n-hexadecyl amine-fixed CELLULOFINE GC-200m was obtained (fixed amount: 29 µmol/g- in wet weight).

Then 0.2 ml of the n-hexadecyl amine-fixed CELLULOFINE GC-200m was taken out, and thereto was added 1.2 ml of 50% ethanol/saline solution to which endogenous cannabinoid, i.e., anandamide (Calbiochem-Novabiochem Corporation available from Novabiochem Co., Ltd.) is added to make up the cannabinoid concentration of 0.1 mg/ml. The mixture was shaken at 37° C. for two hours. After shaking, supernatant was removed and washed with saline, and then 1.2 ml of 95% ethanol was added thereto to elute the adsorbed anandamide. By measuring ultraviolet ray absorption of the ethanol-added supernatant at a wavelength of 208 nm, concentration of anandamide was determined, and the amount of adsorption was calculated.

EXAMPLE 2

The epoxidated CELLULOFINE GC-200m obtained in Example 1 was taken out in an amount of 10 ml, and 200 mg of n-dodecyl amine (Σf=5.12) was added thereto. The mixture was kept in 50 (v/v) % ethanol/water solution at 45° C. and reaction was continued for six days. After the reaction was completed, washing was performed by 50 (v/v) % ethanol/water solution, ethanol, 50 (v/v) % ethanol/water solution and then by water. Then, n-dodecyl amine-fixed CELLULOFINE GC-200m was obtained (fixed amount: 27 µmol/g- in wet weight).

The obtained n-dodecyl amine-fixed CELLULOFINE GC-200m was shaken with 50% ethanol/saline solution to which anandamide is added in the same manner as in Example 1. Then, anandamide was eluted with ethanol and the adsorption amount of anandamide was calculated.

EXAMPLE 3

In the same manner as in Example 2 except that n-dodecyl amine was changed to n-decyl amine (Σ f=4.07), n-decyl amine-fixed CELLULOFINE GC-200m (fixed amount: 27 μmol/g- in wet weight) was obtained. The n-decyl amine-fixed CELLULOFINE GC-200m was shaken with 50% ethanol/saline solution to which anandamide was added in the same manner as in Example 1. Then, anandamide was eluted with ethanol and the adsorption amount of anandamide was calculated.

COMPARATIVE EXAMPLE 1

In the same manner as in Example 2 except that n-dodecyl amine was changed to n-octyl amine (Log P=2.90), n-octyl amine-fixed CELLULOFINE GC-200m (fixed amount: 28 μmol/g- in wet weight) was obtained. The n-octyl amine-fixed CELLULOFINE GC-200m was shaken with 50% ethanol/saline solution to which anandamide was added in the same manner as in Example 1. Then, anandamide was eluted with ethanol and the adsorption amount of anandamide was calculated.

COMPARATIVE EXAMPLE 2

In the same manner as in Example 2 except that n-dodecyl amine was changed to n-hexyl amine (Log P=2.06), n-hexyl amine-fixed CELLULOFINE GC-200m (fixed amount: 30 μmol/g- in wet weight) was obtained. The n-hexyl amine-fixed CELLULOFINE GC-200m was shaken with 50% ethanol/saline solution to which anandamide was added in the same manner as in Example 1. Then, anandamide was eluted with ethanol and the adsorption amount of anandamide was calculated.

COMPARATIVE EXAMPLE 3

In the same manner as in Example 2 except that n-dodecyl amine was changed to n-butyl amine (Log P=0.97), n-butyl amine-fixed CELLULOFINE GC-200m (fixed amount: 32 μmol/g- in wet weight) was obtained. The n-butyl amine-fixed CELLULOFINE GC-200m was shaken with 50% ethanol/saline solution to which anandamide was added in the same manner as in Example 1. Then, anandamide was eluted with ethanol and the adsorption amount of anandamide was calculated.

TABLE 1

|  | Adsorption amount of anandamide (μg/ml-adsorbent) | Adsorption ratio (%) |
| --- | --- | --- |
| Ex. No. 1 | 518 | 86.3 |
| Ex. No. 2 | 128 | 21.3 |
| Ex. No. 3 | 166 | 27.7 |
| Com. Ex. No. 1 | 9.0 | 1.5 |
| Com. Ex. No. 2 | 8.4 | 1.4 |
| Com. Ex. No. 3 | 5.8 | 1.0 |

EXAMPLE 4

The n-hexadecyl amine-fixed CELLULOFINE GC-200m obtained in Example 1 was taken out in an amount of 0.2 ml, and thereto was added 1.2 ml of 50% ethanol/saline solution to which endogenous cannabinoid, i.e., 2-AG (Calbiochem available from Nova Biochem Co., Ltd.) was added to make up the cannabinoid concentration of 0.1 mg/ml. The mixture was shaken at 37° C. for two hours. After shaking, supernatant was removed and washed with saline, and then 1.2 ml of 95% ethanol was added thereto to elute the adsorbed 2-AG. By measuring ultraviolet ray absorption of the ethanol-added supernatant at a wavelength of 208 nm, concentration of 2-AG was determined, and the amount of adsorption was calculated.

EXAMPLE 5

The n-dodecyl amine-fixed CELLULOFINE GC-200m obtained in Example 2 was shaken with a 50% ethanol/saline solution to which human 2-AG is added in the same manner as in Example 4. Then, the 2-AG was eluted with ethanol and the adsorption amount of 2-AG was calculated.

EXAMPLE 6

The n-decyl amine-fixed CELLULOFINE GC-200m obtained in Example 3 was shaken with a 50% ethanol/saline solution to which human 2-AG was added in the same manner as in Example 4. Then, 2-AG was eluted with ethanol and the adsorption amount of 2-AG was calculated.

COMPARATIVE EXAMPLE 4

The n-octyl amine-fixed CELLULOFINE GC-200m obtained in Comparative Example 1 was shaken with a 50% ethanol/saline solution to which human 2-AG was added in the same manner as in Example 4. Then, 2-AG was eluted with ethanol and the adsorption amount of 2-AG was calculated.

COMPARATIVE EXAMPLE 5

The n-hexyl amine-fixed CELLULOFINE GC-200m obtained in Comparative Example 2 was shaken with a 50% ethanol/saline solution to which human 2-AG was added in the same manner as in Example 4. Then, 2-AG was eluted with ethanol and the adsorption amount of 2-AG was calculated.

COMPARATIVE EXAMPLE 6

The n-butyl amine-fixed CELLULOFINE GC-200m obtained in Comparative Example 3 was shaken with a 50% ethanol/ saline solution to which human 2-AG was added in the same manner as in Example 4. Then, 2-AG was eluted with ethanol and the adsorption amount of 2-AG was calculated.

TABLE 2

|  | Adsorption amount of 2-AG (μg/ml-adsorbent) | Adsorption ratio (%) |
| --- | --- | --- |
| Ex. No. 4 | 87.2 | 14.5 |
| Ex. No. 5 | 62.8 | 10.5 |
| Ex. No. 6 | 56.2 | 9.4 |
| Com. Ex. No. 4 | 12.4 | 2.1 |
| Com. Ex. No. 5 | 10.0 | 1.7 |
| Com. Ex. No. 6 | 8.2 | 1.4 |

By using the adsorbent obtained by the process of the present invention in which a compound having a log P value of at least 3.50 is fixed on a water-insoluble carrier, it is possible to adsorb and remove endogenous cannabinoid effectively.

What is claimed is:

1. A process for adsorbing and removing endogenous cannabinoid comprising a step for contacting an adsorbent with fluid containing endogenous cannabinoid, wherein the adsorbent is obtained by fixing a compound having a log P value, distribution coefficient in octanol-water system, of at least 3.50 on a water-insoluble carrier when a leaving group for fixing the compound is replaced by hydrogen, so that cannabinoids are removed from the fluid.

2. The process of claim 1, wherein the fluid is body fluid.

3. The process of claim 1, wherein the compound is selected from the group consisting of unsaturated hydrocarbons, alcohols, amines, tiols, carboxylic acids and derivatives thereof, halogenated compounds, aldehydes, hydrozydes, isocyanates, glycidil ether, and halogenated silane.

4. The process of claim 1, wherein the compound is an amine.

5. The process of claim 1, wherein the compound is an alkyl amine.

6. The process of claim 1, wherein the compound is selected from decyl amine, dodecyl amine, hexadecyl amine and octadecyl amine.

7. The process of claim 1, wherein the compound is n-decyl amine.

8. The process of claim 1, wherein the compound is n-dodecyl amine.

9. The process of claim 1, wherein the compound is n-hexadecyl amine.

* * * * *